(12) United States Patent
Antonatos et al.

(10) Patent No.: US 10,700,866 B2
(45) Date of Patent: *Jun. 30, 2020

(54) ANONYMOUS ENCRYPTED DATA

(71) Applicant: International Business Machines Corporation, Armonk, NY (US)

(72) Inventors: Spyridon Antonatos, Dublin (IE); Stefano Braghin, Blanchardstown (IE); Akshar Kaul, Bangalore (IN); Manish Kesarwani, Bangalore (IN); Sameep Mehta, New Delhi (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/842,475

(22) Filed: Dec. 14, 2017

(65) Prior Publication Data
US 2019/0020477 A1    Jan. 17, 2019

Related U.S. Application Data

(63) Continuation of application No. 15/648,179, filed on Jul. 12, 2017.

(51) Int. Cl.
*H04L 9/32*        (2006.01)
*G06F 12/14*      (2006.01)
(Continued)

(52) U.S. Cl.
CPC ............ *H04L 9/32* (2013.01); *G06F 12/1408* (2013.01); *G06F 21/6245* (2013.01);
(Continued)

(58) Field of Classification Search
CPC ....... H04L 9/32; H04L 9/0894; H04L 63/107; H04L 63/1052; H04L 63/0421;
(Continued)

(56) References Cited

U.S. PATENT DOCUMENTS

| 6,049,613 A | 4/2000 | Jakobsson |
| 8,495,065 B2 * | 7/2013 | Petersen ............... H04W 4/029 707/737 |

(Continued)

FOREIGN PATENT DOCUMENTS

CN     106570348 A1    4/2017

OTHER PUBLICATIONS

P. Samarati, L. Sweeney "Protecting privacy when disclosing information:k-anonymity and its enforcement through generalization and suppression", Technical Report, SRI international, 1998, 19 pages (Year: 1998).*

(Continued)

*Primary Examiner* — Catherine Thiaw
(74) *Attorney, Agent, or Firm* — Amin, Turocy & Watson, LLP

(57) ABSTRACT

Techniques facilitating autonomously rendering an encrypted data anonymous in a non-trusted environment are provided. In one example, a computer-implemented method can comprise generating, by a system operatively coupled to a processor, a plurality of clusters of encrypted data from an encrypted dataset using a machine learning algorithm. The computer-implemented method can also comprise modifying, by the system, the plurality of clusters based on a defined criterion that can facilitate anonymity of the encrypted data.

8 Claims, 10 Drawing Sheets

(51) Int. Cl.
    *G06F 21/64*    (2013.01)
    *G06N 99/00*    (2019.01)
    *H04L 29/06*    (2006.01)
    *G06F 21/62*    (2013.01)
    *H04L 9/08*    (2006.01)
    *G06N 20/00*    (2019.01)

(52) U.S. Cl.
CPC ............ *G06F 21/64* (2013.01); *G06N 20/00* (2019.01); *H04L 9/0894* (2013.01); *H04L 63/0421* (2013.01); *H04L 63/0428* (2013.01); *H04L 63/107* (2013.01); *G06F 2212/1052* (2013.01); *G06F 2221/034* (2013.01)

(58) Field of Classification Search
CPC . H04L 63/0428; G06N 20/00; G06F 12/1408; G06F 21/6245; G06F 21/64; G06F 2212/1052; G06F 2221/034
See application file for complete search history.

(56) References Cited

U.S. PATENT DOCUMENTS

| | | | |
|---|---|---|---|
| 8,626,749 B1 | 1/2014 | Trepetin et al. | |
| 8,930,896 B1 | 1/2015 | Wiggins | |
| 9,276,911 B2 | 3/2016 | Wang et al. | |
| 9,280,593 B1* | 3/2016 | Dykstra | G06F 16/285 |
| 9,378,382 B1 | 6/2016 | Swamidass | |
| 9,471,883 B2* | 10/2016 | Chatterjee | G06F 16/93 |
| 2003/0130893 A1 | 7/2003 | Farmer | |
| 2007/0140479 A1 | 6/2007 | Wang et al. | |
| 2009/0204631 A1 | 8/2009 | Pomroy et al. | |
| 2010/0114920 A1 | 5/2010 | Srivastava et al. | |
| 2011/0078143 A1* | 3/2011 | Aggarwal | G06F 16/285 707/737 |
| 2012/0254333 A1* | 10/2012 | Chandramouli | G06F 40/40 709/206 |
| 2013/0117563 A1 | 5/2013 | Grabelkovsky | |
| 2013/0226922 A1 | 8/2013 | Labenski et al. | |
| 2013/0318347 A1 | 11/2013 | Moffat | |
| 2013/0325759 A1* | 12/2013 | Rachevsky | G10L 15/063 706/12 |
| 2014/0195798 A1 | 7/2014 | Brugger et al. | |
| 2014/0288821 A1* | 9/2014 | Modica | G06Q 50/30 701/465 |
| 2015/0148021 A1* | 5/2015 | Jeyakeerthi | H04W 8/24 455/418 |
| 2015/0339488 A1* | 11/2015 | Takahashi | G06F 21/6218 726/29 |
| 2016/0012193 A1* | 1/2016 | Almogy | G06F 19/00 705/3 |
| 2016/0299661 A1* | 10/2016 | Alpert | H04L 67/18 |
| 2017/0053214 A1* | 2/2017 | Bellala | H04L 63/0227 |
| 2017/0236055 A1* | 8/2017 | Lin | G06N 3/0472 706/20 |
| 2017/0255790 A1* | 9/2017 | Barrett | G06F 21/6254 |
| 2018/0017405 A1* | 1/2018 | Chen | G06Q 50/30 |
| 2018/0062924 A1* | 3/2018 | Shanks | H04L 41/0813 |
| 2018/0121811 A1* | 5/2018 | Caplan | G06F 7/02 |
| 2018/0234266 A1* | 8/2018 | Rudolph | H04L 65/102 |

OTHER PUBLICATIONS

Samarati et al. 'Protecting privacy when disclosing information: k-anonymity and its enforcement through generalization and suppression', Technical report, SRI International, 1998, 19 pages (Year: 1998).*
Salamatian et al., 'Managing Your Private and Public Data: Bringing Down Inference Attacks Against Your Privacy', IEEE Journal of Selected Topics in Signal Processing, vol. 9, No. 7, Oct. 2015, p. 1240-1255 (Year: 2015).*
International Search Report and Written Opinion dated Oct. 12, 2018 for International Application No. PCT/IB2018/054139, 9 pages.
Chen, et al., "Privacy Protection for Mobile Cloud Data: A Network Coding Approach," arXiv:1701.07075v1 [cs.CR] Jan. 11, 2017, 11 pages.
Allard, et al., "Sanitizing Microdata without Leak: Combining Preventive and Curative Actions," Last Accessed: Apr. 18, 2017, 10 pages.
Liu, et al., "Privacy of Outsourced k-Means Clustering," Last Accessed: Apr. 18, 2017, 11 pages.
Informatica Corporation, "Protect Data Privacy by Persistently Masking Sensitive Information," 2015, 2 pages.
Loukides, et al., "An Efficient Clustering Algorithm for k-Anonymisation," Journal of Computer Science and Technology 23(2): pp. 188-202, Mar. 2008.
Jiang, et al., "Secure Distributed k-Anonymous Pattern Mining," Last Accessed: Apr. 18, 2017, 11 pages.
Wang, "Personalized Anonymity Algorithm Using Clustering Techniques," Journal of Computational Information Systems 7:3 (2011), pp. 924-931.
Byun, et al., "Efficient k-Anonymization Using Clustering Techniques," Last Accessed: Apr. 18, 2017, 13 pages.
Camouflage Software, Inc., "Database Unity Framework," 2015, 3 pages.
Aggarwal, et al., "Achieving Anonymity via Clustering," Last Accessed: Apr. 18, 2017, 10 pages.
Mell et al., "The NIST Definition of Cloud Computing," NIST Special Publication 800-145, Sep. 2011, National Institute of Standards and Technology, U.S. Department of Commerce, 7 pages.
Sashank et al., "Method to Anonymize and Analyze Data Fields Using Level Hashed Trees", Dec. 20, 2013, 12 pages.
Anonymously, "Method and System for Creating Anonymity in Snapshot (Single-Query) Location-Based Services," Sep. 12, 2013, 6 pages.
Anonymously, Secret relations between data to protect sensitive data Aug. 23, 2013, 6 pages.
Non-Final Office Action received for U.S. Appl. No. 15/648,179 dated Feb. 4, 2019, 64 pages.
Office Action for U.S. Appl. No. 15/648,179 dated Jul. 10, 2019, 27 pages.
Boneh, et al., "Evaluating 2-DNF Formulas on Ciphertexts," Apr. 2, 2006, 16 pages.
Jiang, et al., "Secure Distributed Framework for Achieving k-Anonymity," Appear on Special Issue of the VLDB Journal on "Privacy-Preserving Data Management," vol. 15 Issue 4, Nov. 2006, 29 pages.
Informatica, "Informatica Persistent Data Masking," Copyright Informatica LLC 2018, 3 pages.
Imperva, "Data Masking," https://www.imperva.com/products/data-masking/, Retrieved: May 2, 2019, 10 pages.
Non-Final Office Action received for U.S. Appl. No. 15/648,179 dated Nov. 15, 2019, 28 pages.

* cited by examiner

ANONYMOUS ENCRYPTED DATA

BACKGROUND

The subject disclosure relates to rendering encrypted data anonymous, and more specifically, to rendering encrypted data anonymous via a cloud environment.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses and/or computer program products that can render encrypted data anonymous via one or more cloud environments are described.

According to an embodiment, a computer-implemented method is provided. The computer-implemented method can comprise generating, by a system operatively coupled to a processor, a plurality of clusters of encrypted data from an encrypted dataset using a machine learning algorithm. The computer-implemented method can also comprise modifying, by the system, the plurality of clusters based on a defined criterion that can facilitate anonymity of the encrypted data.

According to another embodiment, a system is provided. The system can comprise a memory that can store computer executable components. The system can also comprise a processor, that can be operably coupled to the memory, and that can execute the computer executable components stored in the memory. The computer executable components can comprise a clustering component that can generate a plurality of clusters of encrypted data from an encrypted dataset using a machine learning algorithm. Further, the computer executable components can comprise a modification component that can modify the plurality of clusters based on a defined criterion that can facilitate anonymity of the encrypted data According to another embodiment, a computer program product is provided. The computer program product can render an encrypted dataset anonymous. The computer program product can comprise a computer readable storage medium having program instructions embodied therewith. The program instructions can be executable by a processor to cause the processor to generate a plurality of clusters of encrypted data from the encrypted dataset using a machine learning algorithm. Also, the program instructions can further cause the processor to modify the plurality of clusters based on a defined criterion that can facilitate anonymity of the encrypted data.

DETAILED DESCRIPTION

Figure 1:
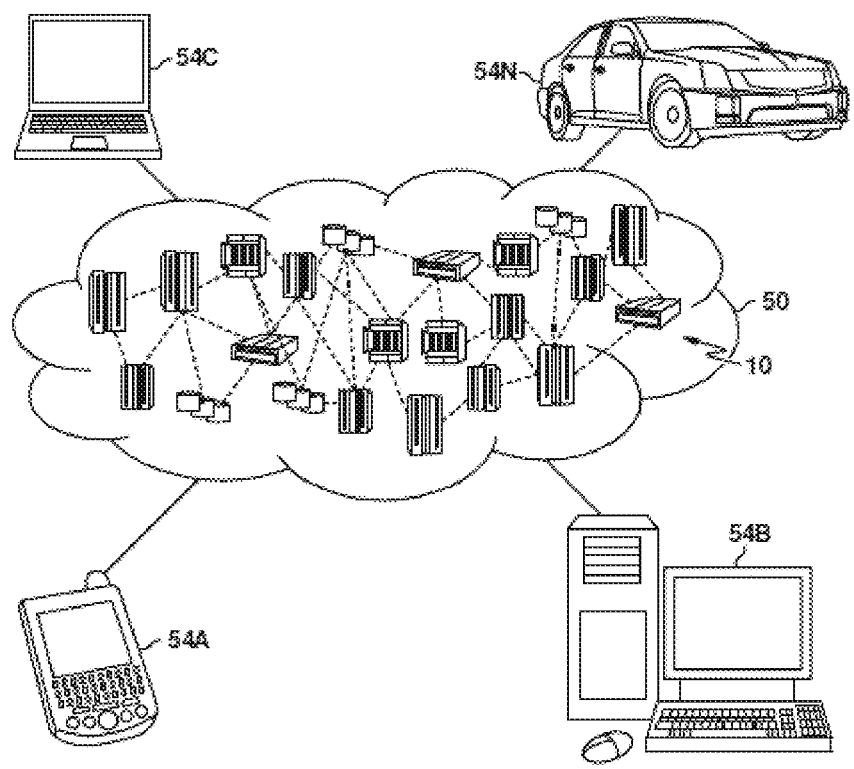
FIG. 1 depicts a cloud computing environment in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and re-assigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
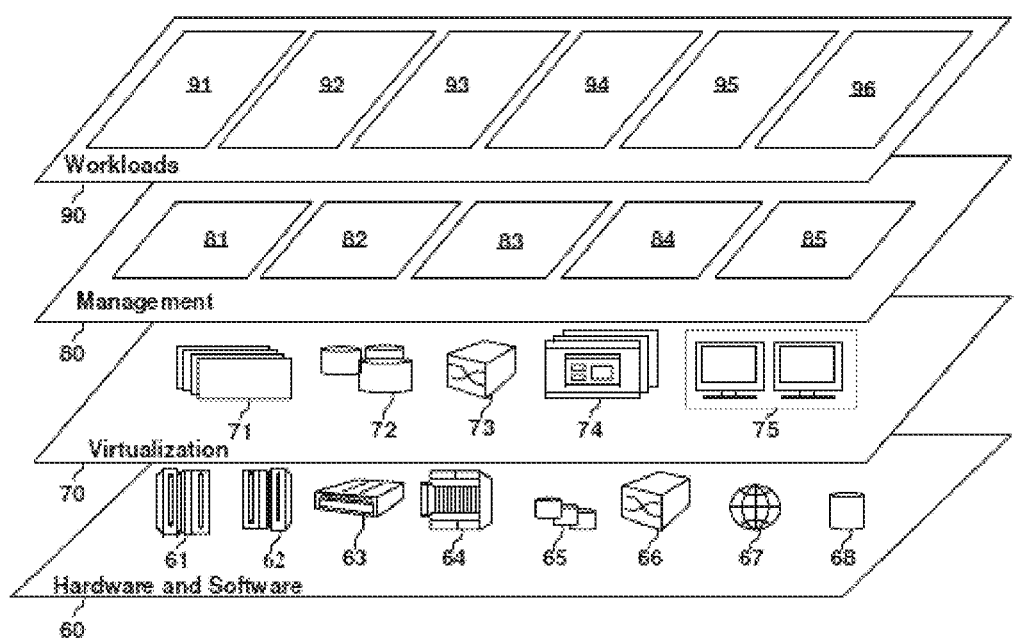
FIG. 2 depicts abstraction model layers in accordance with one or more embodiments described herein.

Referring now to FIG. 2, a set of functional abstraction layers provided by cloud computing environment 50 (FIG. 1) is shown. Repetitive description of like elements employed in other embodiments described herein is omitted for sake of brevity. It should be understood in advance that the components, layers, and functions shown in FIG. 2 are intended to be illustrative only and embodiments of the invention are not limited thereto. As depicted, the following layers and corresponding functions are provided. Repetitive description of like elements employed in other embodiments described herein is omitted for sake of brevity.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and rendering data anonymous 96. Various embodiments of the present invention can utilize the cloud computing environment described with reference to FIGS. 1 and 2 to facilitate rendering encrypted data anonymous over non-trusted environments (e.g., public cloud environments).

Data protection algorithms are becoming increasingly important to support modern business' needs for facilitating data sharing and data monetization. Rendering data anonymous is an important step before sharing data, and cloud services are increasing in popularity as an efficient solution to storing and managing data. However, third parties are often not trusted to store plaintext individual and/or sensitive data. Thus, data encryption has been adopted to protect against intentional and unintentional attempts to read individual and/or sensitive data. Therefore, a need exists to render encrypted data anonymous in non-trusted environments without the need to store plaintext data.

Various embodiments of the present invention can be directed to computer processing systems, computer-implemented methods, apparatus and/or computer program products that facilitate the efficient, effective, and autonomous (e.g., without direct human guidance) to render encrypted data anonymous in an non-trusted environment. For example, one or more embodiments described herein can use clustering techniques to render encrypted data anonymous on a non-trusted environment. As used herein, the term "non-trusted environment" can refer to an environment maintained and operated by a third party that is not the owner of the data stored in the environment. An example non-trusted environment includes, but is not limited to, a public cloud service provider. Further, one or more embodiments described herein can cluster similar records of encrypted data and modify the clusters to meet one or more security requirements. Moreover, various embodiments described herein can suppress and/or re-assign clusters of encrypted data in order to generate clusters comprising a minimum amount of members in order to obtain a desired level of anonymity.

The computer processing systems, computer-implemented methods, apparatus and/or computer program products employ hardware and/or software to solve problems that are highly technical in nature (e.g., encrypting plaintext data, transferring the encrypted data to a non-trusted environment, and rendering the encrypted data anonymous in the non-trusted environment), that are not abstract and cannot be performed as a set of mental acts by a human. For example, a human, or a plurality of humans, cannot efficiently analyze encrypted data to generate a plurality of clusters in order to render the encrypted data anonymous. In contrast, various embodiments of the computer processing systems, computer-implemented methods, apparatus and/or computer program products employing hardware and/or software described herein can efficiently analyze enormous amounts of encrypted data and perform cluster-based anonymousness. Further, it is undesirable to even attempt such an endeavor using a human, or plurality of humans, as one of the advantageous of the embodiments described herein is that the processed data is anonymous. Attempts to use a human to execute the embodiments described herein would be contrary to the purpose of rendering data anonymous as it would result in at least one human having intricate knowledge of the data that is meant to be anonymous.

One or more embodiments may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

Figure 3:
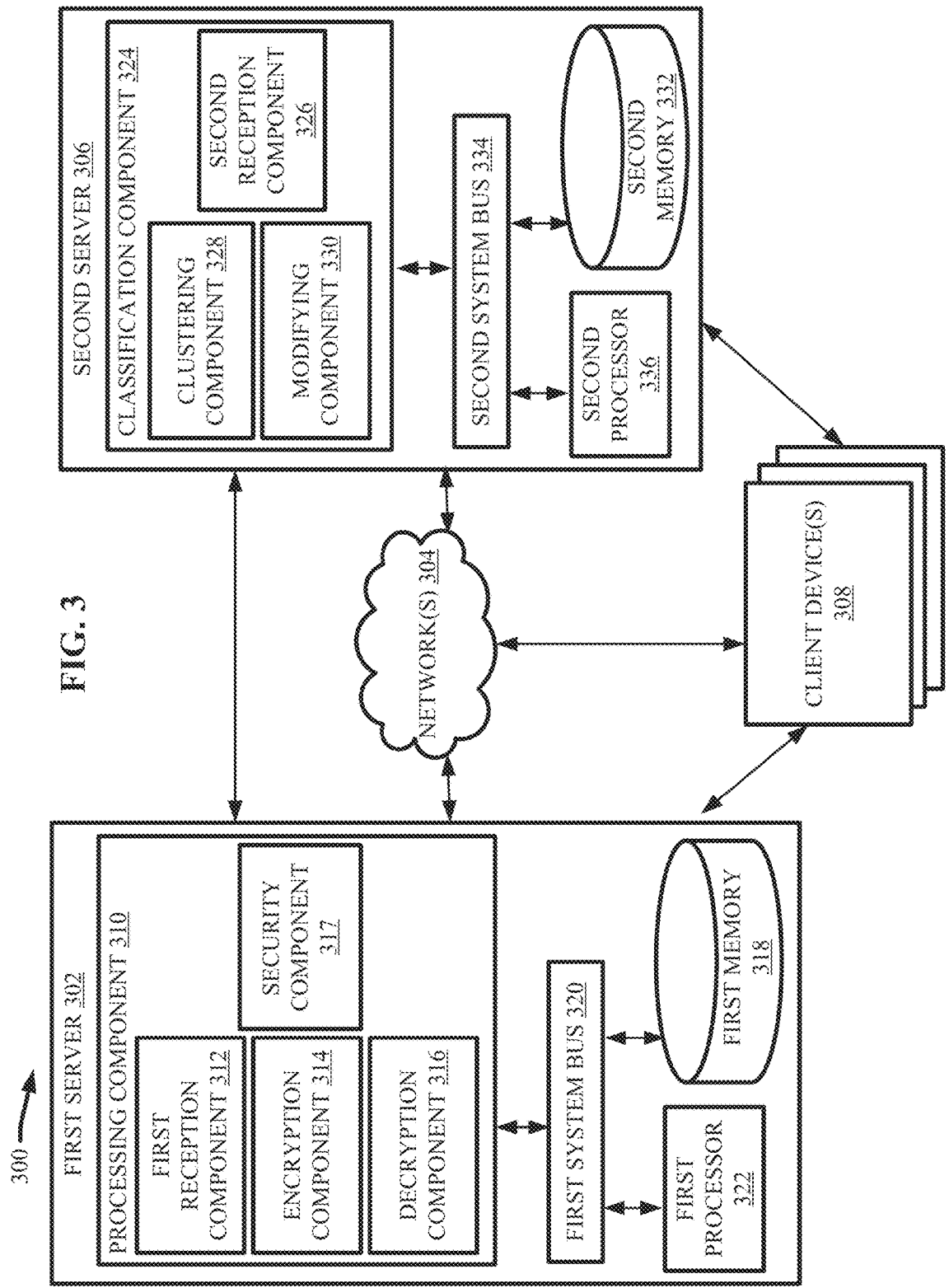
FIG. 3 illustrates a block diagram of an example, non-limiting system that can facilitate rendering an encrypted data anonymous in a non-trusted environment in accordance with one or more embodiments described herein.

FIG. 3 illustrates a block diagram of an example, non-limiting system 300 that can facilitate rendering encrypted data anonymous in a non-trusted environment. Repetitive description of like elements employed in other embodiments described herein is omitted for sake of brevity. Aspects of systems (e.g., system 300 and the like), apparatuses or processes in various embodiments of the present invention can constitute one or more machine-executable components embodied within one or more machines, e.g., embodied in one or more computer readable mediums (or media) associated with one or more machines. Such components, when executed by the one or more machines, e.g., computers, computing devices, virtual machines, etc. can cause the machines to perform the operations described.

As shown in FIG. 3, the system 300 can comprise one or more first servers 302, one or more networks 304, one or more second servers 306, and one or more client devices 308. The first server 302 can comprise processing component 310. The processing component 310 can further comprise first reception component 312, encryption component 314, decryption component 316, and a security component 317. Also, the first server 302 can comprise or otherwise be associated with at least one first memory 318. The first server 302 can further comprise a first system bus 320 that can couple to various components such as, but not limited to, the processing component 310 and associated components, first memory 318 and/or a first processor 322. While a first server 302 is illustrated in FIG. 3, in other embodiments, multiple devices of various types can be associated with or comprise the features shown in FIG. 3. Further, the first server 302 can communicate with the cloud environment depicted in FIGS. 1 and 2 via the one or more networks 304. In various embodiments, the "first server" and/or "second server(s)" can be comprised of processors and/or one or more pieces of hardware and/or software in various embodiments.

The one or more networks 304 can comprise wired and wireless networks, including, but not limited to, a cellular network, a wide area network (WAN) (e.g., the Internet) or a local area network (LAN). For example, the first server 302 can communicate with the second server 306 (and vice versa) using virtually any desired wired or wireless technology including for example, but not limited to: cellular, WAN, wireless fidelity (Wi-Fi), Wi-Max, WLAN, Bluetooth technology, a combination thereof, and/or the like. Further, although in the embodiment shown the processing component 310 can be provided on the one or more first servers 302, it should be appreciated that the architecture of system 300 is not so limited. For example, the processing component 310, or one or more components of processing component 310, can be located at another computer device, such as another server device, a client device, etc.

The second server 306 can comprise classification component 324. The classification component 324 can further comprise second reception component 326, clustering component 328, and modifying component 330. Also, the second server 306 can comprise or otherwise be associated with at least one second memory 332. The second server 306 can further comprise a second system bus 334 that can couple to various components such as, but not limited to, the classification component 324 and associated components, second memory 332 and/or a second processor 336. While a second server 306 is illustrated in FIG. 3, in other embodiments, multiple devices of various types can be associated with or comprise the features shown in FIG. 3. Further, the second server 306 can communicate with the cloud environment depicted in FIGS. 1 and 2 via the one or more networks 304.

The one or more client devices 308 can be computers and/or computerized devices operated by entities that want to analyze, store, and/or otherwise use data owned by one or more entities that manage the first server 302. The one or more client devices 308 can be operably coupled to the first server 302 and the second server 306 via the one or more networks 304 (e.g., via the Internet, a local network, and/or a direct electrical connection). Further, the one or more client devices 308 can be operably coupled to the first server 302 using a first means and to the second server 306 using a second means, wherein the first and second means can be available via the one or more networks 304. For example, the one or more client devices 308 can be in direct electrical connection with the first server 302 while being operably coupled to the second server 306 via the Internet.

The first reception component 312 can be operably coupled to the encryption component 314, the decryption component 316, the first memory 318, and/or the first processor 322 via the first system bus 320. Further, in one or more embodiments the first reception component 312 can be operably coupled to the encryption component 314, the decryption component 316, the first memory 318, and/or the first processor 322 via one or more networks 304 (e.g., a local area network). Similarly, the second reception component 326 can be operably coupled to the clustering component 328, the modifying component 330, the second memory 332, and/or the second processor 336 via the second system bus 334. Further, in one or more embodiments, the second reception component 326 can be operably coupled to the clustering component 328, the modifying component 330, the second memory 332, and/or the second processor 336 via one or more networks 304 (e.g., a local area network).

The security component 317 can receive one or more security requirements from an operator of the first server 302. Parameters stipulated by the one or more security requirements can include, but are not limited to: a desired number of anonymous clusters to be outputted by the second server 306 and/or a desired number of member per cluster (e.g., at least k members per cluster, wherein k is an integer greater than zero).

The clustering component 328 can cluster encrypted data using a machine learning algorithm. The machine learning algorithm can be a distance based algorithm such as a k-means clustering algorithm. The machine learning algorithm (e.g., k-means clustering algorithm) can partition the encrypted data into a plurality of clusters based on one or more parameters, such as a location identifier (e.g., global positioning coordinates). However, the number of members per cluster is data dependent and the machine learning algorithm does not support generating a minimum number of members per cluster. In other words, the clustering component 328 can use the machine learning algorithm generate a plurality of clusters with the members of each cluster being similar based on one or more parameters, but the number of members in each cluster may not be guaranteed.

In various embodiments, the modifying component 330 can modify the plurality of clusters based on a defined criterion (e.g., one or more of the security requirements) to facilitate rendering the encrypted data anonymous. In one or more embodiments, the modifying component 330 can modify the plurality of clusters in order to achieve k-anonymity, wherein k is the number of members comprising each cluster and is an integer greater than zero. For instance, the modifying component 330 can modify the plurality of clusters to achieve 2-anonymity wherein the one or more security requirements stipulate that each cluster comprises at least two members.

For example, the clustering component 328 can use the machine learning algorithm to generate clusters A, B, and C from ten records of encrypted data. In this example: cluster A can contain four members; cluster B can contain five members, and cluster C can contain one member. Further, the one or more security requirements can stipulate that each cluster is desired to have at least two members. The modifying component 330 can modify clusters A, B, and/or C such that the modified set of clusters each comprise at least two members in order to achieve two-anonymity.

In various embodiments, the modifying component 330 can modify the plurality of clusters by performing suppression operations and/or re-assignment operations. While performing suppression operations, the modifying component 330 can remove a defined amount of the encrypted data and/or clusters in order to eliminate outliers from the plurality of clusters. While performing re-assignment operations, the modifying component 330 can re-assign one or more encrypted data records and/or one or more clusters to another cluster.

In one or more embodiments, the modifying component 330 can suppress a defined amount of encrypted data based on a suppression threshold. The suppression threshold can be an input parameter that defines an amount of encrypted data (e.g., a percentage of records) that can be discarded. For each member of a cluster that fails to meet the one or more security requirements (e.g., fails to have a minimum number of members), the modifying component 330 can calculate the distance between the respective member and the centroid of the rest of the clusters and save only the minimum of these distances. Then the modifying component 330 can sort the saved minimum distances in descending order and identify the suppression threshold amount as far outliers. Thus, those members with the highest minimum distance from the rest of the clusters would be identified as far outliers. Further, the modifying component 330 can remove, and/or instruct the removal, of the far outliers. In one or more embodiments, the modifying component 330 can utilize suppression to discard one or more entire clusters. In one or more embodiments, the modifying component 330 can utilize suppression to generate a new set of encrypted data from which the clustering component 328 can generate a new plurality of clusters.

In one or more embodiments, the modifying component 330 can re-assign one or more encrypted data records from one cluster to another and/or merge existing clusters. For example, if a cluster fails to meet the security requirements (e.g., fails to have a minimum number of members), the modifying component 330 can re-assign the nearest members of clusters with excess members (e.g., clusters having more than the minimum number of members) to the non-compliant cluster. In another example, if a cluster fails to meet the security requirements (e.g., fails to have a minimum number of members), the modifying component 330 can re-assign the members of the non-compliant cluster to the nearest cluster with respect to the member. In another example, if a cluster fails to meet the security requirements (e.g., fails to have a minimum number of members), the modifying component 330 can merge the non-compliant cluster with the nearest cluster.

In various embodiments, when performing re-assignment operations, the modifying component 330 can sort clusters that fail to meet the security requirements (e.g., fail to have a minimum number of members) by size (e.g., from the cluster with the fewest members to the cluster with the most members). Starting with the smallest cluster (e.g., the non-compliant cluster with the fewest members), the modifying component 330 can re-assign each respective member of the smallest cluster to closest cluster. Once the members of the smallest cluster are re-assigned, the modifying component 330 can remove said cluster from the plurality of clusters and re-analyze the plurality of clusters for non-compliant clusters. Further, the modifying component 330 can repeat the re-assigning process until all the remaining clusters are compliant with the one or more security requirements.

Figure 4:
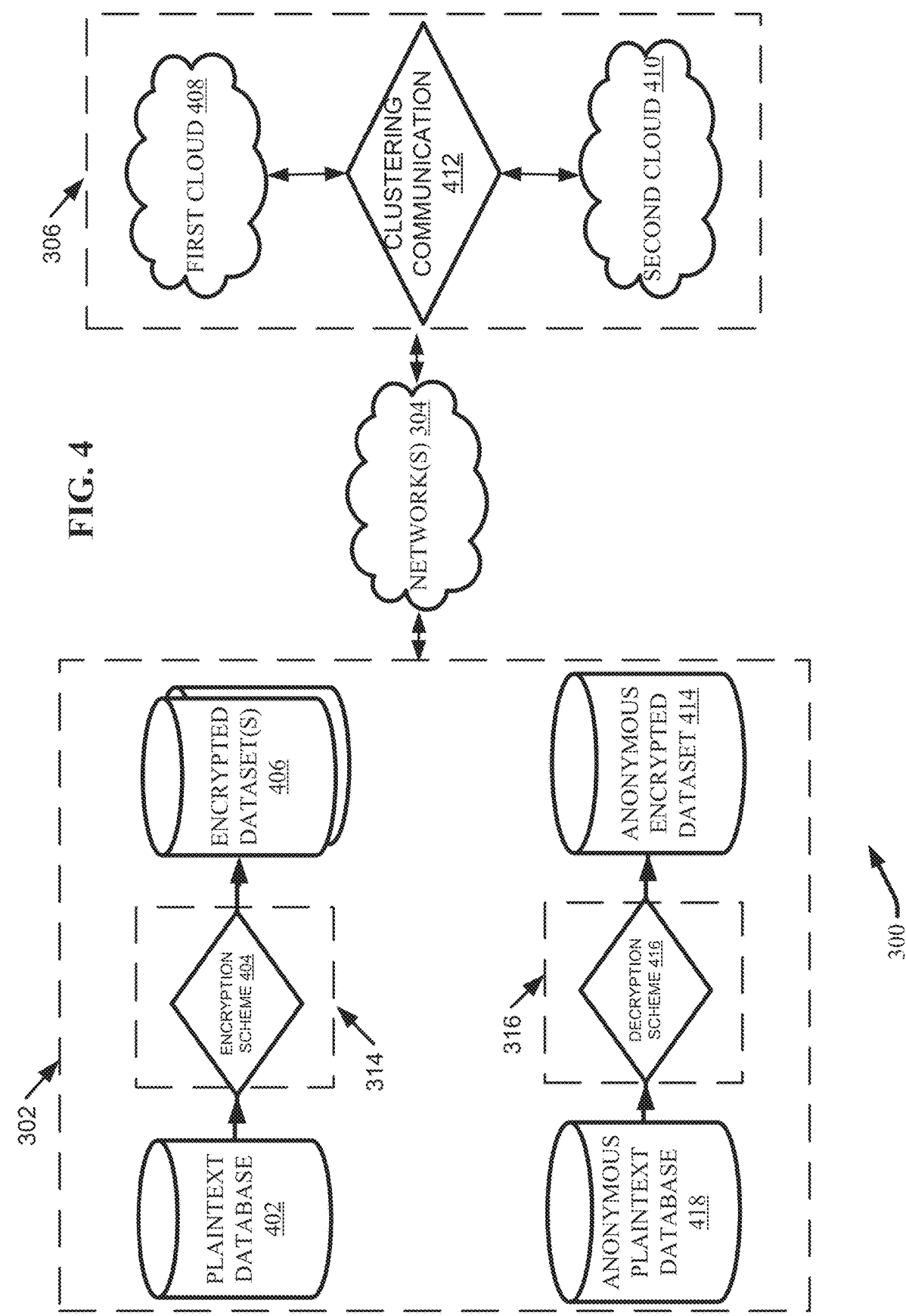
FIG. 4 illustrates a block diagram of an example, non-limiting system that can facilitate rendering an encrypted data anonymous in a non-trusted environment in accordance with one or more embodiments described herein.

FIG. 4 illustrates a block diagram of an example, non-limiting processes that can be performed between the first server 302 and the second server 306. Repetitive description of like elements employed in other embodiments described herein is omitted for sake of brevity. The first memory 318 can store one or more plaintext databases 402 that can comprise one or more records of data without encryption. The first memory 318 can be operably coupled to the processing component 310 via the first system bus 320. The encryption component 314 can retrieve one or more plaintext databases 402 (e.g., from the first memory 318) and subject the plaintext database 402 to one or more encryption schemes 404 to generate one or more encrypted datasets 406. An encryption scheme 404 can encrypt a plaintext database 402 using an encryption algorithm and/or an encryption key. Example encryption schemes 404 can include, but are not limited to: advanced encryption standard (AES); the cryptosystem of Boneh, Goh, and Nissim (BGN); triple data encryption standard (triple DES); Rivest, Shamir, and Adelman (RSA) encryption algorithm; blowfish encryption; and/or twofish encryption. In one or more embodiments, the encryption component 314 can subject a plaintext database 402 to a plurality of different encryption schemes 404 to generate a plurality of encrypted datasets 406 based on the same plaintext database 402. For example, the encryption component 314 can subject a plaintext database 402 to AES encryption and BGN encryption to create two encrypted datasets 406.

The first server 302 (e.g., via the encryption component 314) can transmit one or more encrypted datasets 406 to the second server 306 via one or more networks 304. Further the first server 302 (e.g., via the security component 317) can transmit one or more security requirements to the second server 306. The security requirements can comprise one or more parameters that the second server 306 must meet when rendering the one or more encrypted databases anonymous. An example security requirement can include, but is not limited to, a number indicating the minimum amount of members allowed in one or more generated clusters.

The second server 306 can be a non-trusted environment. Further, the second server 306 can comprise a federated cloud environment. For example, as illustrated in FIG. 4, the second server 306 can comprise a first cloud 408 and a second cloud 410. In various embodiments, the second server 306 can comprise more than two clouds (e.g., 3, 4, 5, or more clouds). The second reception component 326 can be located on the first cloud 408 and can receive the one or more encrypted datasets 406 and the one or more security requirements.

The clustering component 328 can be located on the first cloud 408 or the second cloud 410. Also the modifying component 316 can be located on the first cloud 408 or the second cloud 410. The first cloud 408 and the second cloud 410 can be operably coupled via one or more networks 304 to facilitate clustering communication 412. Clustering communications 412 between the first cloud 408 and the second cloud 410 can facilitate rendering the encrypted datasets 406 anonymous. In various embodiments, the second server 306 (e.g., a non-trusted federated cloud environment) can produce an anonymous encrypted dataset 414 from the encrypted dataset 406 in accordance with one or more security requirements. Thus, the second server 306 can retain the practical usefulness of the encrypted dataset 406 (e.g., any insights drawn from the encrypted anonymous data can be similar to the insights from non-anonymous encrypted data) while providing a guarantee that entities subject to the data cannot be identified.

The second server 306 can transmit one or more anonymous encrypted datasets 414 to the first server 302 via the one or more networks 304. The first reception component 312 can receive the anonymous encrypted data and send the anonymous encrypted data to the decryption component 316. The decryption component 316 can decrypt the anonymous encrypted dataset 414 using a decryption scheme 416 to produce an anonymous plaintext database 418.

Figure 5:
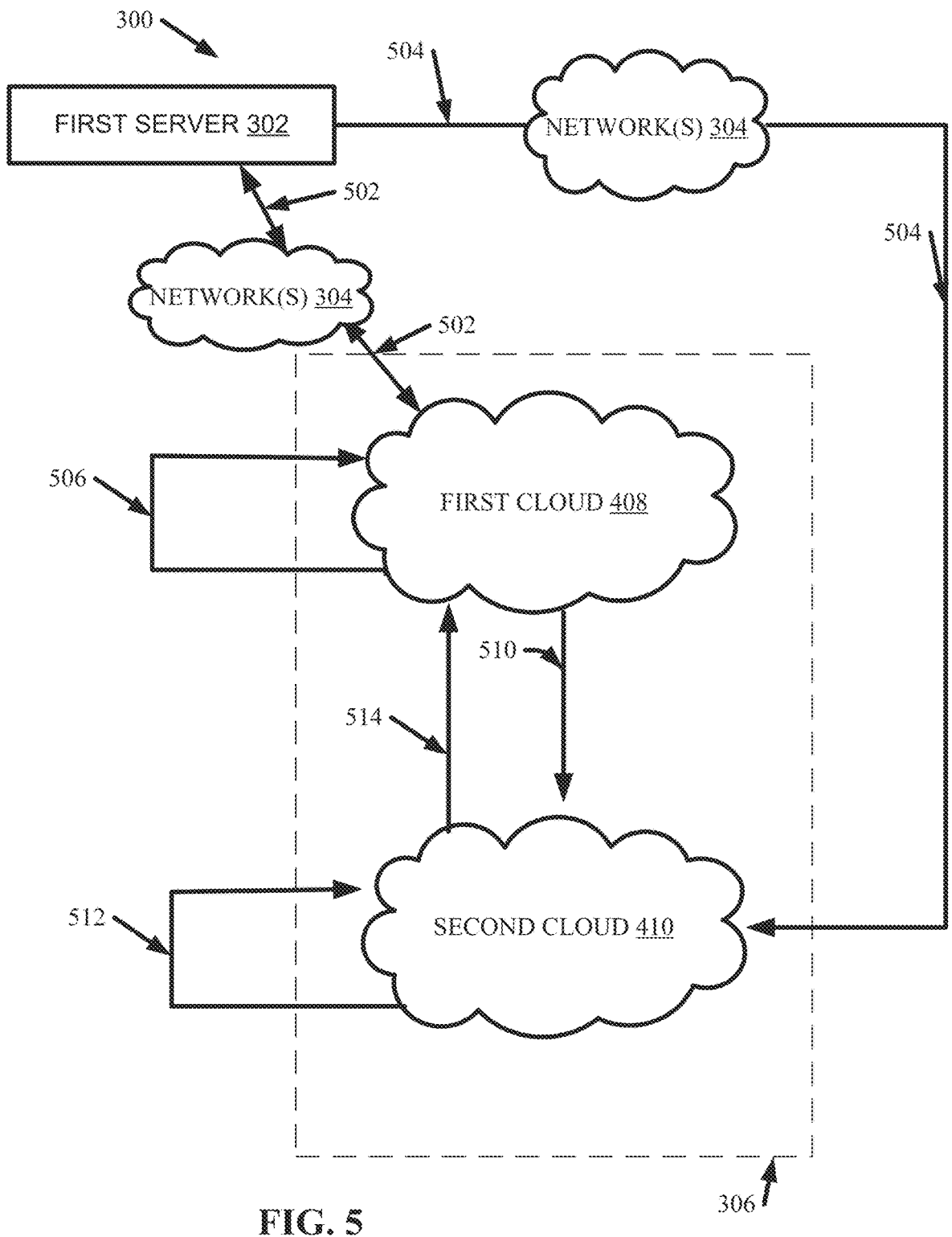
FIG. 5 illustrates another block diagram of an example, non-limiting system that can facilitate rendering an encrypted data anonymous in a non-trusted environment in accordance with one or more embodiments described herein.

FIG. 5 illustrates a block diagram of a non-limiting example of the communications and processes that can be performed by the system 300. Repetitive description of like elements employed in other embodiments described herein is omitted for sake of brevity. At 502, the first server 302 can transmit one or more encrypted datasets 406 and/or one or more security requirements to the first cloud 408 of the second server 306. For example, the first server 302 can send an AES encrypted dataset 406 and a BGN encrypted dataset 406 to the first cloud 408. Also, the AES encrypted dataset 406 and the BGN encrypted dataset 406 can be based on the same plaintext database 402. In various embodiments, the one or more security requirements sent to the first cloud 408 by the first server 302 (e.g., via security component 317) can comprise a defined criterion that facilitates anonymity of the one or more encrypted datasets 406, such as a minimum number of members per cluster generated by the clustering component 328 and modified by the modifying component 316. The second memory 332 can be located in the first cloud 408 and store the one or more encrypted datasets 406 and the one or more security requirements.

At 504, the first server 302 can transmit, via the one or more networks 304, a secret encryption key regarding one or more of the encrypted datasets 406 to the second cloud 410 of the second server 306. For example, the first server 302 can transmit an AES encrypted dataset 406 and a BGN encrypted dataset 406 to the first cloud 408 and also transmit a BGN secret key to the second cloud 410 regarding the BGN encrypted dataset 406.

At 506, the first cloud 408 (e.g., via the clustering component 328) can randomly select a number of encrypted data records from an encrypted dataset 406 to act as the initial centers of the plurality of clusters. The number of initial centers can be designated by the one or more security requirements. In various embodiments, one or more encrypted data records can be selected as initial centers of the plurality of clusters based on parameters of the encrypted data record. For example, one or more encrypted data records can be selected based on one or more location identifiers associated with the encrypted data records, wherein the location identifiers can designate one or more geographical coordinates regarding the source of the subject encrypted data record.

At 510, the first cloud 408 (e.g., via the clustering component 328) can send the second cloud 410 (e.g., the modifying component 330) encrypted cluster sums and number. In various embodiments, the first cloud 408 (e.g., the clustering component 328) can generate clusters based on location identifiers associated with encrypted data records in the one or more encrypted datasets 406. For example, the clustering component 328 can determine a distance between each encrypted data record and the randomly selected initial cluster centers. The first cloud 408 can send to the second cloud 410: the total number of encrypted data records in a subject encrypted data set 406, the determined distances (e.g., determined by the clustering component 328), the number of desired clusters (e.g., designated by the one or more security requirements), the initial cluster centers (e.g., selected by the clustering component 328), and/or the number of desired cluster members (e.g., designated by the one or more security requirements).

At 512, the second cloud 410 (e.g., via the modifying component 330 can compute a new means for clustering the encrypted data records of the subject encrypted dataset 406 based on the inputs received from the first cloud 408. In one or more embodiments, the second cloud 410 (e.g., via the modifying component 330) can determine a new means for clustering by dividing cluster sums by their respective cluster number.

At 514, the second cloud 410 (e.g., via the modifying component 330) can return the new computed clustering means to the clustering component 328 of the first cloud 408, whereupon the clustering component 328 can adjust the generated one or more clusters based on the new clustering means. The communication between the first cloud 408 and the second cloud 410 (e.g., at 508, 510, and 514) can comprise the clustering communication 412. In various embodiments, the second server 306 can repeat the clustering communication 412 multiple times in order to generate a desired convergence based on at least the one or more security requirements. Thus, the first cloud 408 can utilize the second cloud 410 to partition the encrypted data records of one or more encrypted datasets 406 while revealing a minimum amount of information regarding the encrypted dataset 406, such as the similarity of one or more encrypted data records to an initial cluster center based on a desired parameter.

Figure 6:
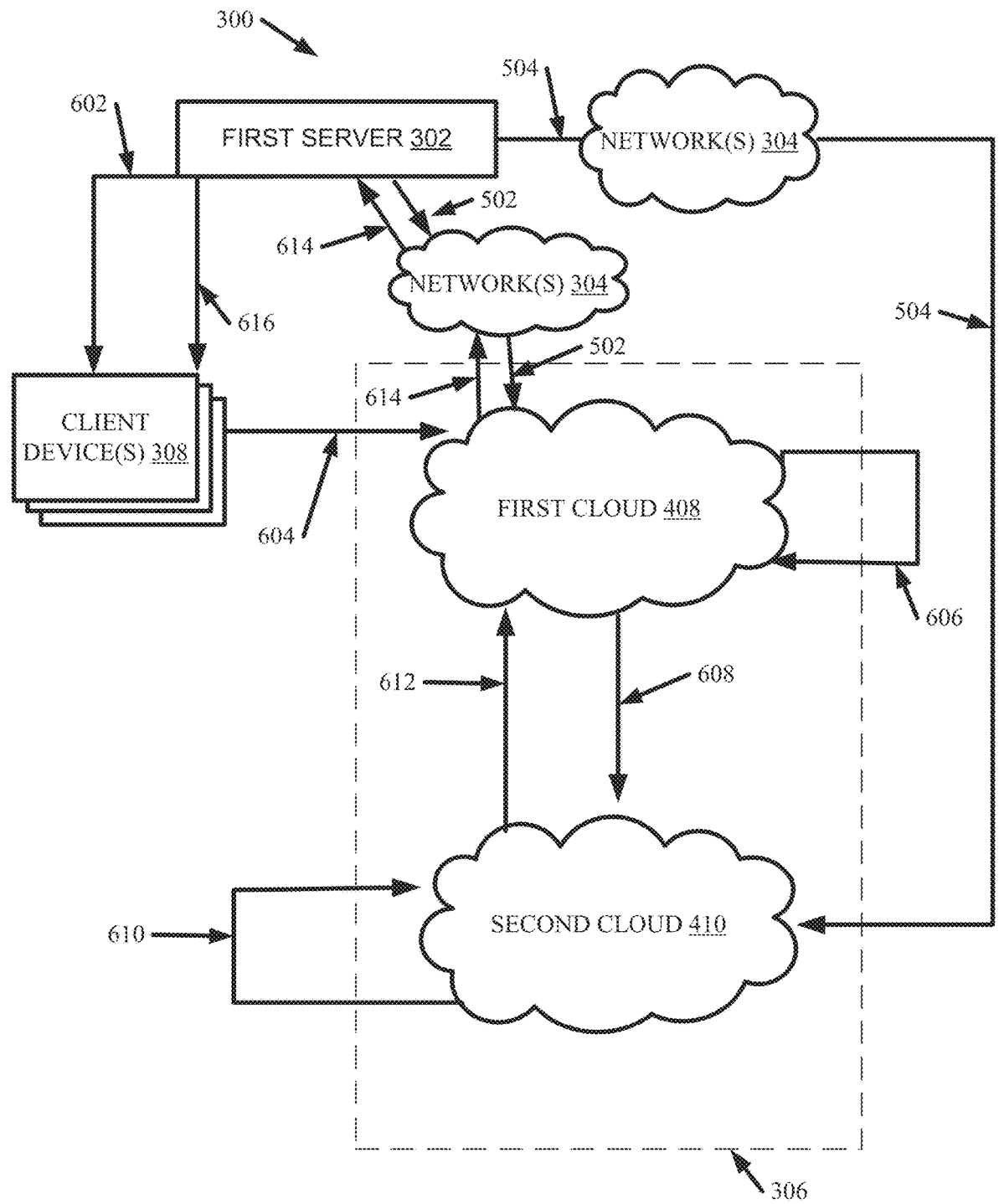
FIG. 6 illustrates another block diagram of an example, non-limiting system that can facilitate rendering an encrypted data anonymous in a non-trusted environment in accordance with one or more embodiments described herein.

FIG. 6 illustrates a block diagram of another non-limiting example of the communications and processes that can be performed by the system 300 with regard to a client device's 308 query. Repetitive description of like elements employed in other embodiments described herein is omitted for sake of brevity. At 602, the first server 302 can transmit (e.g., via the encryption component 314 and one or more networks 304) a public encryption key regarding one or more of the encrypted datasets 406 to one or more of the client devices 308. For example, the first server 302 can transmit an AES encrypted dataset 406 and a BGN encrypted dataset 406 to the first cloud 408 and also transmit a BGN public key to one or more client devices 308 regarding the BGN encrypted dataset 406. At 604, one or more of the client devices 308 can send an encrypted query to the first cloud 408 (e.g., via one or more networks 304) using the public encryption key.

At 606, the first cloud 408 (e.g., via the clustering component 328) can calculate the distance (e.g., squared Euclidean distance) between one or more encrypted data records and the encrypted query. At 608, the first cloud 408 (e.g., via the clustering component 328) can send the encrypted distances along with one or more identifiers (e.g., anonymous identifiers) to the second cloud 410. The identifiers can regard respective encrypted data records associated with the distances. For example, the identifiers can include, but are not limited to, row identifiers (e.g., anonymous row identifiers) that indicate an encrypted data record's location in an encrypted dataset 406.

In various embodiments, wherein the first cloud 408 receives multiple encrypted datasets 406 regarding the same plaintext database 402, the first cloud 408 only sends the encrypted distances of one of the encrypted datasets 406, preferably the encrypted dataset 406 having an encryption scheme relating to the secret encryption key sent to the second cloud 410 at 504. For example, wherein the first cloud 408 receives an AES encrypted dataset 406 and a BGN encrypted dataset 406, and the second cloud 410 receives a BGN encrypted secret key, the first cloud 408 can send to the second cloud 410 only BGN encrypted distances. Thus, the second cloud 410 can utilize the encrypted secret key to decrypt the computed encrypted distances.

At 610, the second cloud 410 (e.g., via modifying component 330) can decrypt the one or more distances (e.g. squared Euclidean distances) and find the identifiers associated with distances of at least a predetermined value. For example, the second cloud 410 (e.g., via modifying component 330) can identify the distances having the smallest computed distance from the encrypted query. Further, the second cloud 410 (e.g., via modifying component 330) can identify a minimum number of distances identified based on one or more security requirements.

In one or more embodiments, the second cloud 410 (e.g., via the modifying component 330) can select identifiers based on a plurality of security requirements. For example, the plurality of security requirements can stipulate a minimum number of clusters to partition one or more encrypted datasets 406 into and a minimum number of members per cluster.

At 612, the second cloud 410 (e.g., via the modifying component 330) can send the selected identifiers to the first cloud 408. Based on the selected identifiers, the first cloud 408 (e.g., via the clustering component 328) can identify one or more encrypted data records from one or more of the encrypted datasets 406. Further, the first cloud 408 (e.g., via the clustering component 328) can generate a cluster representative for each cluster associated with the one or more identifiers to generate an anonymous encrypted dataset 414. Thus, the first cloud 408 can cluster the encrypted data without decrypting the encrypted datasets 406, and the second cloud can modify the plurality of clusters without knowledge of the encrypted dataset 406 except the computed distances.

At 614, the first cloud 408 (e.g., via the clustering component 328) can send the anonymous encrypted dataset 414 to the first server 302. The first server 302 can receive the anonymous encrypted dataset 414 (e.g., via first reception component 312) and decrypt the anonymous encrypted dataset 414 using a decryption scheme 416 (e.g., via the decryption component 316) to generate an anonymous plaintext database 418. At 616, the first server 302 can send the anonymous plaintext database 418 to the one or more client devices 308 that sent the encrypted query at 604.

Figure 7A:
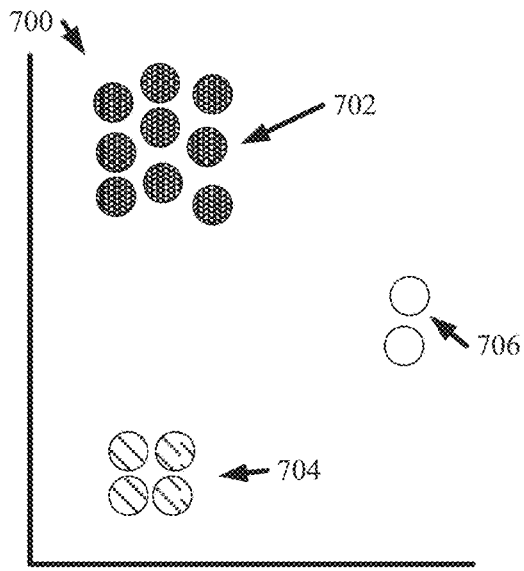
FIG. 7A illustrates an example, non-limiting diagram of encrypted data clustering using a machine learning algorithm in accordance with one or more embodiments described herein.

FIGS. 7A, 7B, 7C, and 7D illustrate various diagrams of cluster modifications that can be performed by the system 300. Repetitive description of like elements employed in other embodiments described herein is omitted for sake of brevity. FIG. 7A illustrates a diagram 700 in which fifteen encrypted data records can be represented as circles, wherein the encrypted data records can be partitioned into three clusters: a first cluster 702 designated by dotted circles, a second cluster 704 designated by diagonally striped circles, and a third cluster 706 designated by empty circles. The diagram 700 illustrates three example clusters that can be generated by the clustering component 328 without modification.

Figure 7B:
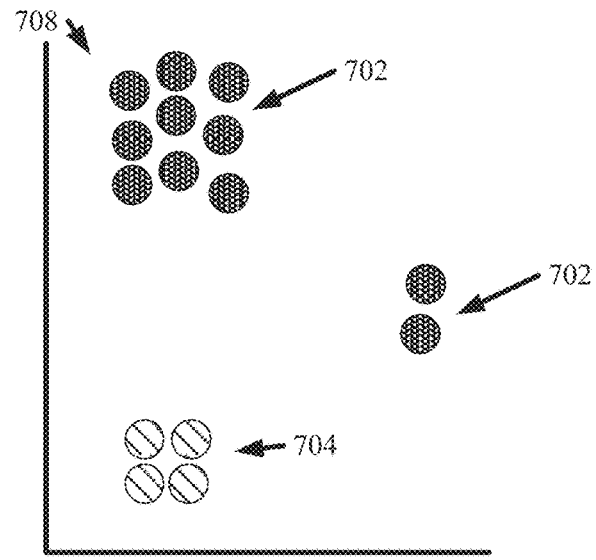
FIG. 7B illustrates an example, non-limiting diagram of modified data clustering in accordance with one or more security requirements to facilitate rendering encrypted data anonymous in accordance with one or more embodiments described herein.

FIG. 7B illustrates another diagram 708 of the same fifteen encrypted data records; however the first cluster 702 and the third cluster 706 have been modified (e.g., via the modifying component 330) based on one or more security requirements. With regards to the modification illustrated by diagram 708, the security requirement can stipulate that each cluster have at least three members. As shown in FIG. 7A, the third cluster 706 comprised only two members, which is less than the three member security requirement. In order to meet the security requirement, the modifying component 330 can modify the first cluster 702 and the third cluster 706 such that the two encrypted data records previously included in the third cluster 706 are re-assigned to the first cluster 702. Thus, the modifying component 330 can re-assign one or more encrypted data records and/or one or more entire clusters to a different cluster based on one or more security requirements.

Figure 7C:
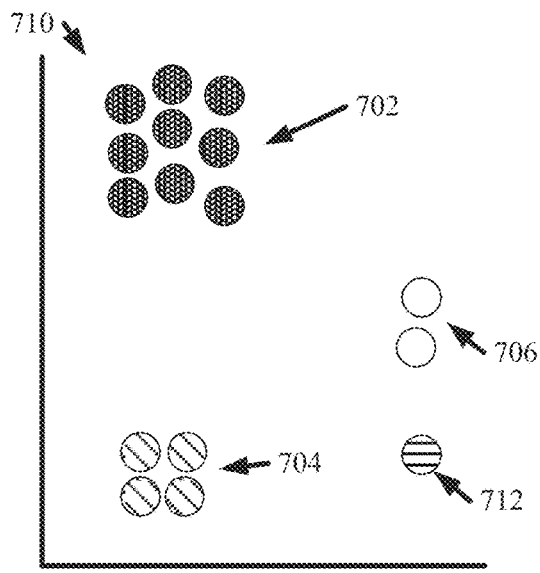
FIG. 7C illustrates another example, non-limiting diagram of encrypted data clustering using a machine learning algorithm in accordance with one or more embodiments described herein.

FIG. 7C illustrates another diagram 710 of sixteen encrypted data records partitioned into the first cluster 702, the second cluster 704, the third cluster 706, and a fourth cluster 712 designated by horizontally striped circles. The diagram 710 illustrates four example clusters that can be generated by the clustering component 328 without modification.

Figure 7D:
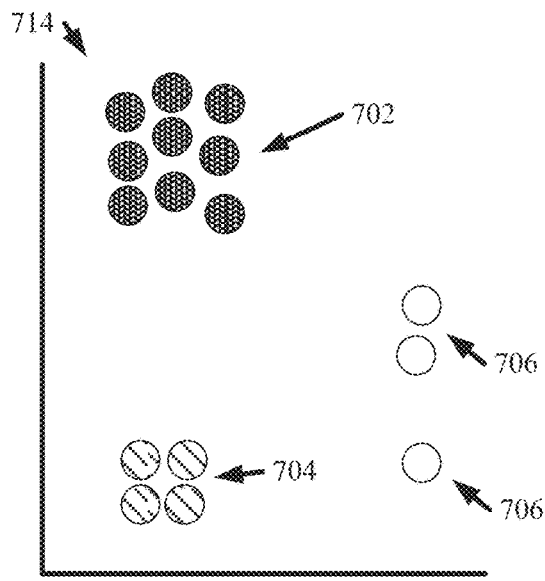
FIG. 7D illustrates another example, non-limiting diagram of modified data clustering based on one or more security requirements to facilitate rendering encrypted data anonymous in accordance with one or more embodiments described herein.

FIG. 7D illustrates another diagram 714 of the same sixteen encrypted data records; however, the third cluster 706 and the fourth cluster 712 have been modified (e.g., via the modifying component 330) based on one or more security requirements. With regards to the modification illustrated by diagram 714, the security requirement can stipulate that each cluster have at least three members. As shown in FIG. 7C, the third cluster 706 (with two members) and the fourth cluster 712 (with one member) each have less than the three members stipulated by the security requirement. The modifying component 330 can order the clusters based on the number of members in each cluster and modify the clusters in order starting with the cluster with the fewest number of members (e.g., the fourth cluster 712). As shown in FIG. 7D, the modifying component 330 can re-assign the encrypted data records of one cluster (e.g., the fourth cluster 712) to another cluster (e.g., the third cluster 706) in order to meet the one or more security requirements (e.g., a minimum number of at least three members). Thus, in instances wherein the clustering component 328 generates a plurality of clusters that fail to meet the one or more security requirements, the modifying component 330 can merge multiple non-compliant clusters together in order to form a cluster that does meet the one or more security requirements.

Figure 8:
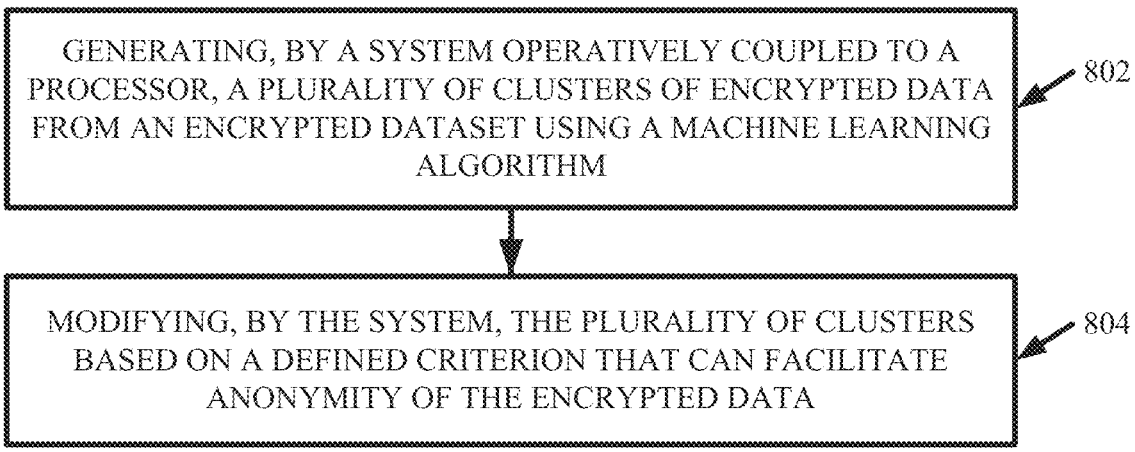
FIG. 8 illustrates a flow chart of an example, non-limiting computer-implemented method that can facilitate rendering encrypted data anonymous in a non-trusted environment in accordance with one or more embodiments described herein.

FIG. 8 illustrates a flow chart of a computer-implemented method 800 that can facilitate rendering encrypted data anonymous in a non-trusted environment. At 802, the method 800 can comprise generating, by a system 300 operatively coupled to a processor (e.g., first processor 322), a plurality of clusters (e.g. via clustering component 328) of encrypted data from an encrypted dataset 406 using a machine learning algorithm. At the 804, the method 800 can also comprise modifying, by the system 300, the plurality of clusters (e.g., via the modifying component 330) based on a defined criterion that can facilitate anonymity of the encrypted data.

Figure 9:
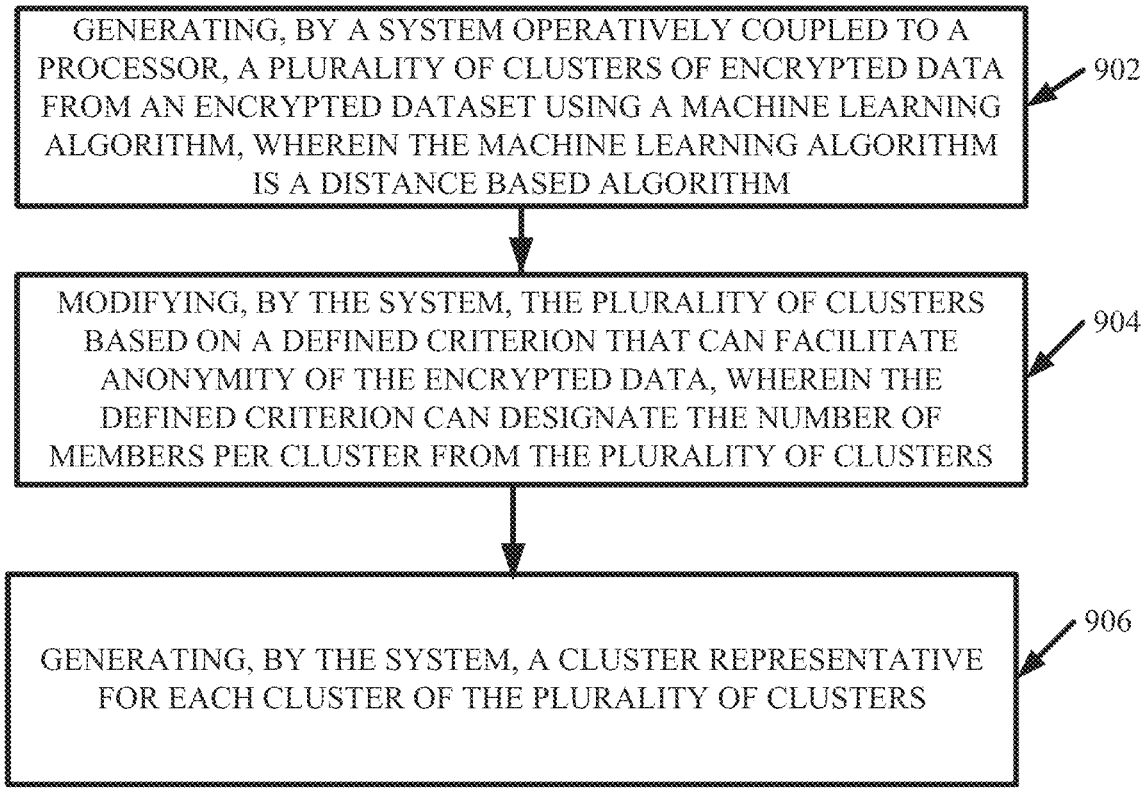
FIG. 9 illustrates another flow chart of an example, non-limiting computer-implemented method that can facilitate rendering encrypted data anonymous in a non-trusted environment in accordance with one or more embodiments described herein.

FIG. 9 illustrates a flow chart of a computer-implemented method 900 that can facilitate rendering encrypted data anonymous in a non-trusted environment. At 902, the method 900 can comprise generating, by a system 300 operatively coupled to a processor (e.g., first processor 322), a plurality of clusters (e.g. via clustering component 328) of encrypted data from an encrypted dataset 406 using a machine learning algorithm, wherein the machine learning algorithm can be a distance based algorithm. Also, generating the plurality of clusters can be based on one or more location identifiers associated with the encrypted data.

At 904, the method 900 can also comprise modifying, by the system 300, the plurality of clusters (e.g., via the modifying component 330) based on a defined criterion that can facilitate anonymity of the encrypted data. For example, the defined criterion can set a minimum number of members per cluster from the plurality of clusters. At 906, the method 900 can further comprise generating a cluster representative for each cluster of the plurality of clusters (e.g., via the clustering component 328). The cluster representative can be generated before or after modification of the plurality of clusters.

In various embodiments, modifying the plurality of clusters can comprise suppressing a cluster from the plurality of clusters based on a suppression threshold that can designate an amount of encrypted data from the encrypted dataset 406 to be removed. Also, suppressing the cluster can comprise: identifying, by the system 300, encrypted data within the cluster to be removed based on a location identifier associated with the encrypted data (e.g., via the modifying component 330); removing, by the system 300, the identified encrypted data from the encrypted dataset 406 to generate a second encrypted dataset (e.g., via the modifying component 330); and generating, by the system 300, a second plurality of clusters of encrypted data from the second encrypted dataset using the machine learning algorithm (e.g., via the clustering component 328).

In one or more embodiments, modifying the plurality of clusters can comprise re-assigning the encrypted data from one cluster (e.g., third cluster 706) from the plurality of clusters to another cluster (e.g., first cluster 702) from the plurality of clusters based on a parameter (e.g., a location identifier). In various embodiments, the modifying component 330 can perform both suppressing operations and re-assigning operations to the encrypted data. In one or more embodiments, the modifying component 330 can only perform suppressing operations to the encrypted data. In one or more embodiments, the modifying component 330 can only perform re-assigning operations to the encrypted data.

Figure 10:
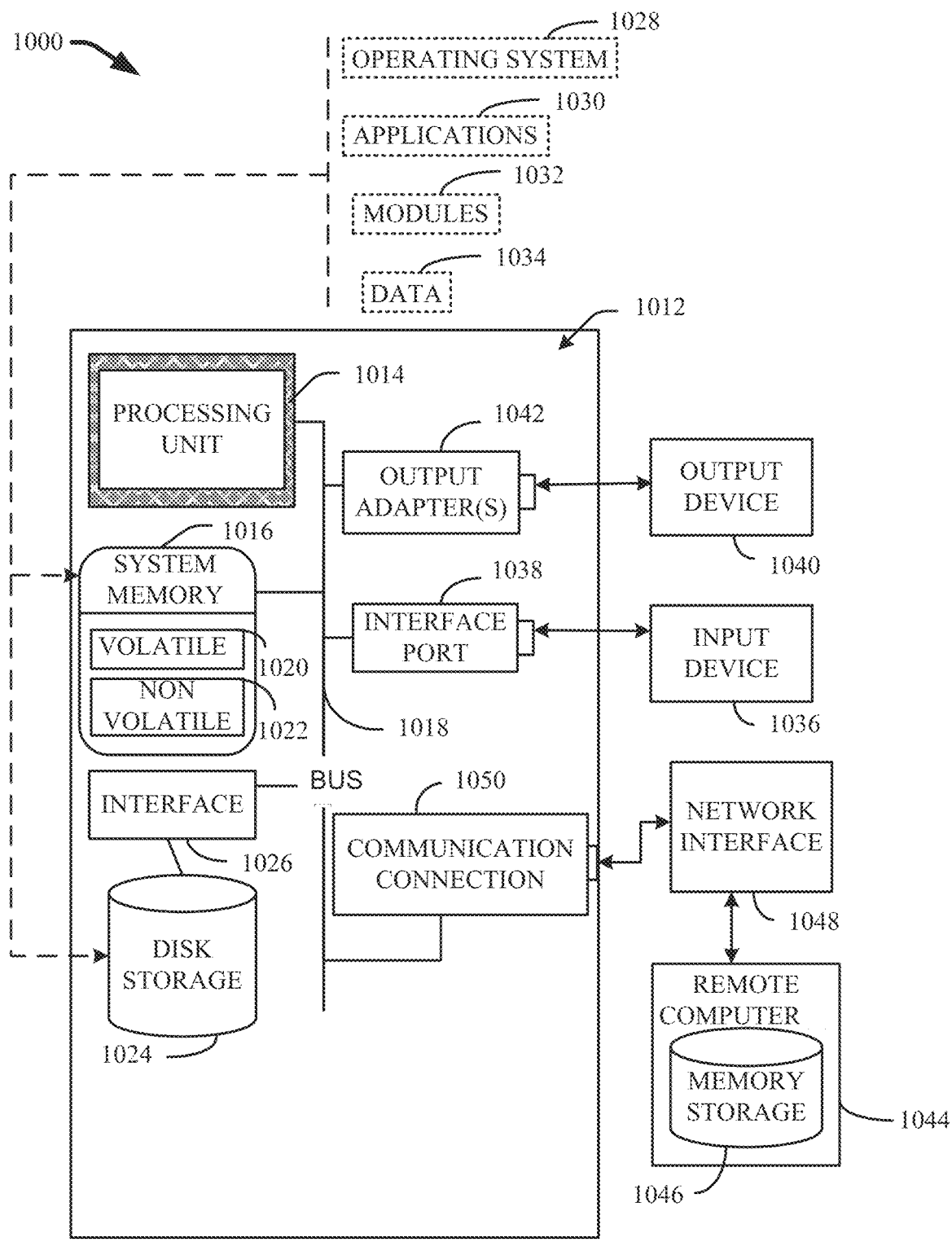
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity. With reference to FIG. 10, a suitable operating environment 1000 for implementing various aspects of this disclosure can include a computer 1012. The computer 1012 can also include a processing unit 1014, a system memory 1016, and a system bus 1018. The system bus 1018 can operably couple system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structures including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire, and Small Computer Systems Interface (SCSI). The system memory 1016 can also include volatile memory 1020 and nonvolatile memory 1022. The basic input/output system (BIOS), containing the basic routines to transfer information between elements within the computer 1012, such as during start-up, can be stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1020 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface can be used, such as interface 1026. FIG. 10 also depicts software that can act as an intermediary between users and the basic computer resources described in the suitable operating environment 1000. Such software can also include, for example, an operating system 1028. Operating system 1028, which can be stored on disk storage 1024, acts to control and allocate resources of the computer 1012. System applications 1030 can take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through one or more input devices 1036. Input devices 1036 can include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices can connect to the processing unit 1014 through the system bus 1018 via one or more interface ports 1038. The one or more Interface ports 1038 can include, for example, a serial port, a parallel port, a game port, and a universal serial bus (USB). One or more output devices 1040 can use some of the same type of ports as input device 1036. Thus, for example, a USB port can be used to provide input to computer 1012, and to output information from computer 1012 to an output device 1040. Output adapter 1042 can be provided to illustrate that there are some output devices 1040 like monitors, speakers, and printers, among other output devices 1040, which require special adapters. The output adapters 1042 can include, by way of illustration and not limitation, video and sound cards that provide a means of connection between the output device 1040 and the system bus 1018. It should be noted that other devices and/or systems of devices provide both input and output capabilities such as one or more remote computers 1044.

Computer 1012 can operate in a networked environment using logical connections to one or more remote computers, such as remote computer 1044. The remote computer 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer 1044. Remote computer 1044 can be logically connected to computer 1012 through a network interface 1048 and then physically connected via communication connection 1050. Further, operation can be distributed across multiple (local and remote) systems. Network interface 1048 can encompass wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). One or more communication connections 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

Embodiments of the present invention can be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device including, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components including a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
generating, by a system operatively coupled to a processor, a plurality of clusters of encrypted data from an encrypted dataset using a machine learning algorithm, wherein the machine learning algorithm is a distance based clustering algorithm based on a location identifier of geographical coordinates;
modifying, by the system, the plurality of clusters based on a defined security requirements that facilitates anonymity of the encrypted data, wherein the modifying comprises re-assigning one or more members of a non-compliant cluster of the plurality of clusters to a nearest cluster with respect to the one or more members, and wherein the re-assigning the one or more members comprises:
sorting, by size, clusters of the plurality of clusters that fail to meet the defined security requirements, wherein the sorting is sorting from a cluster with the fewest members to a cluster with the most members, the clusters that fail to meet the defined security requirements;
re-assigning members of the cluster with the fewest members that is a non-compliant cluster to the nearest cluster;
after the re-assigning, removing the cluster with the fewest members from the plurality of clusters and re-analyzing the plurality of clusters for other non-compliant clusters; and
performing the re-assigning the one or more members iteratively until all non-compliant clusters of the plurality of clusters have been removed; and
wherein the modification renders the encrypted data anonymous on a non-trusted environment.

2. The computer-implemented method of claim 1, wherein the defined security requirements set a minimum number of members per cluster from the plurality of clusters.

3. The computer-implemented method of claim 1, wherein the modifying further comprising suppressing a cluster from the plurality of clusters based on a suppression threshold that designates an amount of encrypted data from the encrypted dataset to be removed.

4. The computer-implemented method of claim 3, wherein the suppressing comprising:
identifying, by the system, encrypted data within the cluster to be removed based on a location indicator associated with the encrypted data;
removing, by the system, the identified encrypted data from the encrypted dataset to generate a second encrypted dataset; and
generating, by the system, a second plurality of clusters of encrypted data from the second encrypted dataset using the machine learning algorithm.

5. The computer-implemented method of claim 4, wherein the modifying further comprises re-assigning the encrypted data of the second encrypted dataset from a first cluster from the plurality of clusters to a second cluster of the plurality of clusters based on a parameter.

6. The computer-implemented method of claim 3, wherein the suppressing comprising removing the cluster from the plurality of clusters.

7. The computer-implemented method of claim 1, wherein the modifying further comprising re-assigning the encrypted data from a first cluster from the plurality of clusters to a second cluster of the plurality of clusters based on a parameter.

8. The computer-implemented method of claim 7, wherein the parameter is a location indicator associated with encrypted data being re-assigned.

\* \* \* \* \*